United States Patent [19]

Gietema et al.

[11] Patent Number: 4,710,773

[45] Date of Patent: Dec. 1, 1987

[54] DATA CONVERTER FOR A PULSE RADAR APPARATUS

[75] Inventors: Jouke Gietema; Bernard H. M. Oude Elberink, both of Oldenzaal, Netherlands

[73] Assignee: Hollandse Signaalapparaten B.V., Hengelo, Netherlands

[21] Appl. No.: 22,503

[22] Filed: Mar. 6, 1987

Related U.S. Application Data

[63] Continuation of Ser. No. 508,219, Jun. 27, 1983.

[30] Foreign Application Priority Data

Jul. 9, 1982 [NL] Netherlands ..................... 8202784

[51] Int. Cl.$^4$ ............................................ G01S 13/72
[52] U.S. Cl. ................................................. 342/185
[58] Field of Search ............... 342/176, 185, 190, 197

[56] References Cited

U.S. PATENT DOCUMENTS

| | | | |
|---|---|---|---|
| 3,821,735 | 6/1974 | Lasoff et al. ..................... | 343/5 DP |
| 3,898,656 | 8/1975 | Jensen ............................... | 343/7.7 |
| 3,905,032 | 9/1975 | Truel et al. ................. | 343/17.1 R X |
| 4,204,342 | 5/1980 | Linfield ......................... | 343/17.7 X |
| 4,208,657 | 6/1980 | Bryden et al. .................. | 343/5 DP |
| 4,224,619 | 9/1980 | Bean et al. ........................ | 343/5 EM |
| 4,224,621 | 9/1980 | Cornett et al. ................... | 343/5 EM |
| 4,307,396 | 12/1981 | Slater .............................. | 343/5 EM |
| 4,355,312 | 10/1982 | Bosi et al. ......................... | 343/5 VQ |
| 4,357,607 | 11/1982 | Van der Heijden et al. .... | 343/5 VQ |
| 4,450,446 | 5/1984 | Clancy et al. ............. | 343/17.1 R X |

Primary Examiner—T. H. Tubbesing
Assistant Examiner—John B. Sotomayor
Attorney, Agent, or Firm—Robert J. Kraus

[57] ABSTRACT

A pulse radar apparatus is provided with a transmitter and receiver unit (1), a video extractor (2) connected thereto for obtaining digitized plotting data, a plot processor (3) for determining the track positions with the associated digital data from the plotting data obtained in consecutive antenna revolutions, and a display system (5) for presenting both the video signals from the transmitter and receiver unit (1) and the track positions with the associated digital data. The pulse radar apparatus is furthermore provided with a data converter (4) deriving video signals from the plotting data, which video signals, after mixing with the video signals from the transmitter and receiver unit (1) are presented on the display (5) on a real-time basis.

8 Claims, 3 Drawing Figures

DATA CONVERTER FOR A PULSE RADAR APPARATUS

This is a continuation of application Ser. No. 508,219, filed June 27, 1983.

BACKGROUND OF THE INVENTION

The invention relates to a data converter for a pulse radar apparatus provided with a transmitter and receiver unit; a video extractor connected thereto for obtaining, from the video signals supplied to the video extractor, digitized plotting data consisting of radar target data; a plot processor for determining the track positions with the associated digital data from the plotting data obtained in consecutive antenna revolutions; and a display system for presenting both the video signals from the transmitter and receiver unit and the track positions with the associated digital data.

Thus from the video signals of the transmitter and receiver unit, i.e. the real-time raw video, various digitized plotting data can be derived in the video extractor, including the polar coordinates of the target centroid, the number of hits detected when the radar beam illuminates the target, and the target echo signal strength. From the plotting data obtained in consecutive antenna revolutions the plot processor determines the target course and velocity, i.e. the track formation, to be able to predict future target positions or track positions. The plot processor supplies the track positions to a display for presentation in the form of symbols and labels, which may contain the target velocity, course and track number. For the sake of brevity, the data from the plot processor is denoted synthetic video. The real-time raw video is displayed during the listening time of the transmitter and receiver unit; this permits the synthetic video to be displayed during the interval between the end of a listening time and the start of a following listening time. In many cases, however, the time required to display synthetic video is much greater than the time available for this. It is true that the synthetic video could be displayed during the time available for the display of the real-time raw vido, but this would result in a loss of radar information. The present invention has therefore for its object to overcome this disadvantage.

SUMMARY OF THE INVENTION

According to the invention, the data converter derives video signals from the supplied plotting data, which video signals, after mixing with the video signals from the transmitter and receiver unit, are presented on the display on a real-time basis. That is, the synthetic video, at least a portion thereof, is so adapted that it can be mixed with the real-time raw video, dispensing with the necessity to use any additional display time. Such a conversion from synthetic to real-time video may be effected for a selective number of consecutive radar sweeps and antenna revolutions to present a desired target direction of motion on the display. The data converter will hereinafter be called a plot history generator to express the specific character of this converter.

BRIEF DESCRIPTION OF THE DRAWING

The invention will now be described with reference to the accompanying figures, of which.

DESCRIPTION OF THE PREFERRED EMBODIMENT

Figure 1:
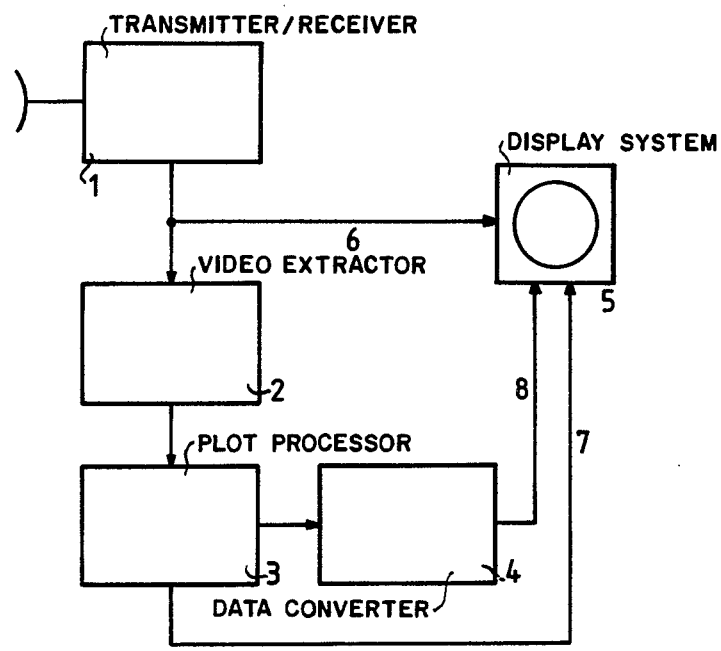
FIG. 1 is a block diagram of the pulse radar apparatus.

The pulse radar apparatus of FIG. 1 contains a transmitter and receiver unit 1, a video extractor 2, a plot processor 3, a plot history generator 4 and a display 5. The display 5 receives the real-time raw video from transmitter and receiver unit 1 via line 6, the synthetic video from plot processor 3 via line 7, and the converted synthetic video from plot history generator 4 via line 8.

Figure 2:
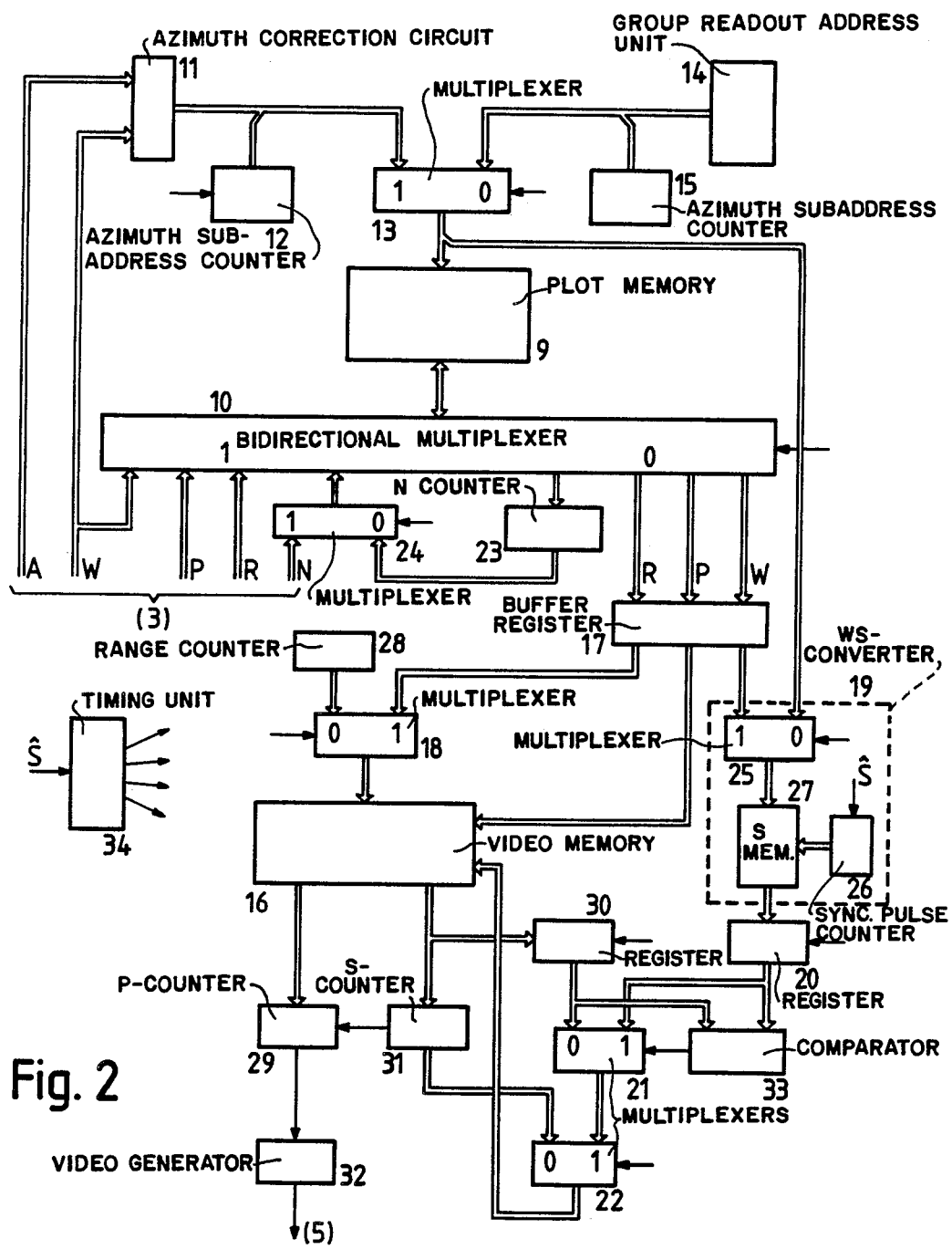
FIG. 2 is a block diagram illustrating an embodiment of the plot history generator.

The plot history generator 4 illustrated in the block diagram of FIG. 2 comprises a plot memory 9 for storing, via the bidirectional multiplexer 10, the plotting data, containing the echo length P, the width W and the range R of a plot, and the number of antenna revolutions N - during which antenna revolutions a plot is to be displayed - at addresses determined by the azimuth value A, also contained in the plotting data.

The azimuth value A from plot processor 3 locates the centroid of a plot. With the conversion from synthetic to real-time video, the first of the number of hits per radar scan S is taken into account. Plot history generator 4 therefore comprises an azimuth correction circuit 11 for producing, in response to the A and W values, the azimuth value $A - \frac{1}{2}W$; this azimuth value determines the "plot group" address for plot memory 9. Because several plots may have a like azimuth value, the plot group address is accompanied with a "plot unit" address supplied by the azimuth subaddress counter 12. The combination of group address and unit address specifies the memory address where the P, W, R and N values can be stored; this memory address is supplied to plot memory 9 via multiplexer 13.

Writing into the plot memory occurs with addressing based on azimuth values. However, in reading out the plot memory and writing into the video memory, due allowance must be made for the readout periods initiated by sync pulses; that is an addressing based on sync pulses is required. The plot history generator thereto comprises a group-readout address unit 14. Unit 14 effects a plot memory readout on the basis of sync pulses and in azimuthal sequence. The design and operation of this unit are hereinafter described with reference to FIG. 3. Since the plot memory may contain the data of severl plots with a like azimuth value, an azimuth subaddress counter 15 is incorporated for the readout; this counter counts the plot unit addresses. The memory address determined by the group-readout address unit 14 and the azimuth subaddress counter 15 is supplied to plot memory 9 via multiplexer 13.

The plot history generator further comprises a video memory 16 for storing in a period of N consecutive antenna revolutions, each time the radar antenna reaches the azimuth value concerned, the plotting data of the plot memory 9, consisting of the echo length P and the plot width W, at addresses determined by the range R, and for supplying the display 5 with a video signal during a number of consecutive radar sweeps S corresponding with the plot width W and for a period determined by the echo length P, each time the electron beam reaches the range R on the display with the azimuth value concerned.

The video memory 16 receives the write addresses, determined by the range R, via the bidirectional multiplexer 10, buffer register 17 and the multiplexer 18. The echo length P is transferred to video memory 16 via bidirectional multiplexer 10 and buffer register 17. The plot width W is supplied to the WS converter 19 via bidirectional multiplexer 10 and buffer register 17 to convert this width into the number of hits per radar scan S, i.e. the number of sweeps during which an echo signal of a plot is detected. The number of hits per scan S is subsequently transferred to video memory 16 via register 20 and multiplexers 21 and 22. It will be obvious that the N value is not transferred to the video memory. With each readout of the plotting data from plot memory 9, the value of N is decremented by one and returned to the plot memory. The plotting data concerned are read out of the plot memory 9 and fed to the video memory 16 for a period of so many antenna revolutions that N is zero. Each readout, the value of N is decremented by 1 in the N counter 23 and returned to the plot memory 9 via multiplexer 24 and bidirectional multiplexer 10.

The WS converter 19 consists of a multiplexer 25, a sync-pulse counter 26 and an S memory 27. For each value of W, this memory contains a corresponding value of S. Since the number of sweeps per scan is subject to variation, e.g. through a staggered pulse repetition frequency or through variations in the rotational velocity of the antenna, the contents of memory 27 are to be revised permanently. To this effect, the sync pulse counter 26 counts the number of radar sweeps or the number of sync pulses $\hat{S}$ in the time when n azimuth count pulses are recorded; the sync pulse counter is reset after each n azimuth count pulses. With the transmission of F sweeps per antenna revolution and in the time when n azimuth count pulses are recorded, the sync pulse counter 26 counts $nF/N$ sync pulses $\hat{S}$, where N is the number of azimuth count pulses corresponding with one antenna revolution. At the times when $n/k, 2n/k, \ldots, n$ azimuth count pulses are recorded, the sync pulse count is $nF/Nk, 2nF/Nk, \ldots, nF/N$. The write addresses for the S memory are now formed by the bits of the group readout address unit 14, determining the values $n/k, 2n/k, \ldots, n$. With these addresses the sync pulse counts $nF/Nk, 2nF/Nk, \ldots, nF/N$ are loaded into S memory 27 via multiplexers 13 and 25. In this way the contents of this memory are updated $N/n$ times per antenna revolution. The readout addresses for the S memory are formed by the W values supplied from buffer register 17 via multiplexer 25. The S value corresponding with the W value is transferred from memory 27 to register 20.

The readout of video memory 16 is range-sequential; the addresses for the P and S values read out in succession are supplied by range counter 28 via multiplexer 18. The echo length P is read out of video memory 16 for a period of S consecutive radar sweeps and recorded in the P counter 29. To this effect the number of hits per scan S is not only transferred from the video memory to register 30, but also to the S counter 31; the S value in this counter is decremented by one in each sweep and returned to video memory 16 via multiplexer 22. So long as the value of S is greater than zero, the P counter 29 supplies video generator 32 with a signal for a period corresponding with the counting of the value from the video memory on a real-time basis. In response to this, the video generator 32 supplies the video signal for application to display 5.

It may however occur that the buffer register 20 receives a new S value from WS converter 19, while the S value in video memory 16 has not yet been counted to zero; this situation arises when plots overlap each other. The new S value may not be transferred to video memory 16 via multiplexers 21 and 22, unless this value is greater than the S value already contained in video memory 16. To this effect the two S values are compared in comparator 33. If the new S value is greater than the S value in the video memory, the multiplexer 21 passes the new S value; if the new S value is not greater than the S value in the video memory, the latter value is returned to video memory 16 via multiplexer 21.

The above-described conversion in the plot history generator is controlled by the timing unit 34. This control may be based on an interlaced timing method or on a "listening time/rest time distribution". With the latter type of timing, the plotting data are stored in the plot memory and the video data to be displayed are read out of the video memory during the listening time starting with the transmission of the radar pulse; during the rest time following the listening time and lasting until the next radar pulse transmission the particular plot data, either adapted or not, are transferred from the plot memory to the video memory. In the cases when the rest time is of short duration, for example in the case of staggered pulse repetition frequencies, the "interlaced timing" method is preferred; with this method groups of timing pulses are generated in succession to effect the apparently parallel writing and readout of the plot and video memories.

Figure 3:
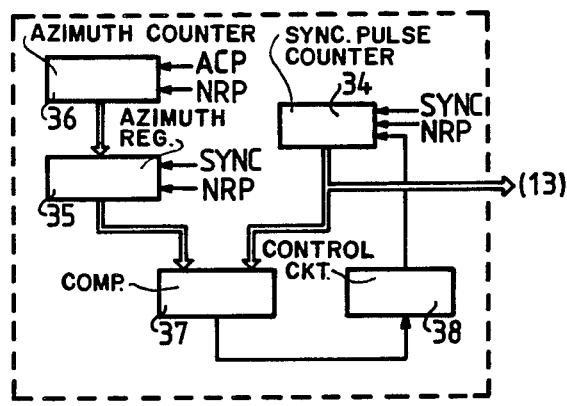
FIG. 3 is a feasible embodiment of a circuit forming part of the plot history generator.

FIG. 3 illustrates an embodiment of the group readout address unit 14. This unit comprises a sync pulse counter 34, an azimuth register 35, an azimuth counter 36, a comparator 37, and a control circuit 38. Using the north pulse NRP as reference, the sync pulse counter 34 supplies the count, functioning as group address for the readout of plot memory 9, with each sync pulse, i.e. with each radar pulse transmission. The count of sync pulse counter 34, however, will not always correspond with the correct azimuth. The number of azimuth values is fixed at $2^n$ and is recorded in azimuth counter 36. This counter counts the ACP azimuth count pulses of the radar antenna, using the north pulse NRP as reference. With the appearance of each sync pulse the antenna azimuth is transferred to azimuth register 35. If this register were to provide for the group readout addressing and the number of sync pulses were smaller than the number of azimuth values, some azimuth values would be skipped during the readout of the plot memory, so that plotting data would be lost. For this reason the sync pulse counter 34 provides for the group readout addressing. The number of bits of azimuth register 35 should be so selected that the contents thereof are always greater than or equal to the contents of sync pulse counter 34. As soon as the contents of azimuth register 35 are greater than the count of sync pulse counter 34, as established by comparator 37, control circuit 38 increments the sync pulse counter by one step to process the plotting data indicated by the group readout address then obtained. That is, if the contents of azimuth register 35 and that of sync pulse counter 34 do not correspond with each other, a so-called deferred cycle is executed.

We claim:
1. A data converter for a pulse radar apparatus including:

(a) a transmitter/receiver unit for producing video signals representing target information received by an antenna;

(b) video processing means electrically connected to the transmitter/receiver unit and including a video extractor for deriving digitized target plotting data from the video signals, and a plot processor for deriving track positions A, R indicative of the target centroid azimuth position and the target range, respectively, and associated digital data N indicative of the number of antenna revolutions for which the track of a target is to be displayed from the plotting data obtained from consecutive antenna revolutions; and (c) a display system electrically connected to the transmitter/receiver unit and to the video processing means for displaying both the video signals and the track positions and associated digital data;

said data converter comprising an output electrically connected to the display system, input means electrically connected to the video processing means for receiving said track positions and associated digital data, a first memory, a second memory, address means for effecting writing of the data received at said input means into and reading said data from said memories, and timing means for controlling operation of the address means, said address means effecting application of data from the second memory to the display system in such an order that the track followed within said predetermined number of antenna revolutions by a target displayed in real time is simultaneously displayed in synchronism with the radar sweeps;

said data converter being characterized in that:

the input means is adapted to receive from the video processing means digital data indicative of the width W of a target and the length P of a received echo pulse, the address means comprises:

(i) first address means arranged to effect the storage of the quantities R, P, W and N in the first memory locations depending on the azimuth values $A - \frac{1}{2}W$ associated with said data;

(ii) second address means arranged to effect reading from the storage locations of the first memory in a sequence synchronized with the radar sweeps and, at substantially the same time, to effect the writing of the quantities P and W read from the first memory into the second memory at locations depending on the range values R associated with said quantities;

(iii) third address means arranged to effect at each radar sweep the reading of the storage locations of the second memory as a function of range; register means is provided for receiving the P-values from the second memory during a number of sweeps determined by the associated W values; and video signal generator means is provided for converting the P-values from the register means to video signals for application to the display system.

2. A data converter as in claim 1, characterized in that:

(a) the first address means comprises a first azimuth subaddress counter for assigning different subaddresses to the P, W, R and N values occurring with a like azimuth value, the output signal of said first azimuth subaddress counter, together with the azimuth value $A - \frac{1}{2}W$, providing the write address for the first memory; and (b) the second address means comprises a second azimuth subaddress counter and a readout unit for providing subaddresses for each readout address in response to sync pulses initiating the radar sweeps.

3. A data converter as in claim 2, characterized in that the readout unit comprises a sync pulse counter for recording the number of transmitted radar pulses, and an azimuth register for receiving the antenna azimuth value with the appearance of each sync pulse, the number of bits of said azimuth register being such that the contents of the azimuth register are always greater than or equal to that of the sync pulse counter, said sync pulse counter being incremented when the contents of said azimuth register is greater than the contents of the sync pulse counter.

4. A data converter as in claim 1 including a WS converter for converting the plot width W readout of the first memory into a corresponding number of hits per scan S.

5. A data converter as in claim 4, characterized in that the WS converter comprises an S memory for storing for each value of W a corresponding value of S, and a sync pulse counter for adapting the S values contained in said S memory to the possibly varying number of transmitter radar pulses per angular unit.

6. A data converter as in claim 1 including an N counter for decrementing by one the readout N value from the first memory, and means for entering the decremented N value into the first memory.

7. A data converter as in claim 1 including an S counter for decrementing by one the readout S value of the second memory with each radar sweep, and means for entering the decremented S value into the second memory.

8. A data converter as in claim 7 where said register means comprises a P counter for recording the value of P from the second memory as long as $S > 1$, the video signals from the video signal generator having durations corresponding with the time required for the counting of the P count on a real-time basis.

* * * * *